(12) United States Patent
Alamri et al.

(10) Patent No.: US 12,686,742 B2
(45) Date of Patent: Jul. 21, 2026

(54) PROCESS FOR MAKING TRANSPARENT POLYMER-BASED MATERIALS FOR SOLAR PANELS

(71) Applicant: SAUDI ARABIAN OIL COMPANY, Dhahran (SA)

(72) Inventors: Haleema Alamri, Thuwal (SA); Maryah Almaghrabi, Thuwal (SA); Aziz Fihri, Paris (FR)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 623 days.

(21) Appl. No.: 18/048,234

(22) Filed: Oct. 20, 2022

(65) Prior Publication Data

US 2024/0132663 A1 Apr. 25, 2024
US 2024/0228701 A9 Jul. 11, 2024

(51) Int. Cl.
| | |
|---|---|
| *C08G 64/30* | (2006.01) |
| *C08F 20/14* | (2006.01) |
| *C08F 283/02* | (2006.01) |
| *C08G 64/04* | (2006.01) |

(52) U.S. Cl.
CPC ............ *C08G 64/307* (2013.01); *C08F 20/14* (2013.01); *C08F 283/02* (2013.01); *C08G 64/04* (2013.01)

(58) Field of Classification Search
CPC ...... C08G 64/307; C08G 64/04; C08G 64/18; C08G 64/42; C08G 64/14; C08F 20/14; C08F 283/02; C08K 2003/2241; C08K 2003/2244; C08K 2003/2296; C08K 2201/011
See application file for complete search history.

(56) References Cited

U.S. PATENT DOCUMENTS

| | | | |
|---|---|---|---|
| 5,175,199 | A | 12/1992 | Asano et al. |
| 5,510,414 | A | 4/1996 | Okamoto et al. |
| 7,700,696 | B2 | 4/2010 | van de Grampel et al. |
| 8,389,626 | B2 | 3/2013 | Maiti et al. |
| 9,617,416 | B2 | 4/2017 | Tajima |

(Continued)

FOREIGN PATENT DOCUMENTS

| | | |
|---|---|---|
| CN | 101747477 B | 8/2011 |
| CN | 111748189 A | 10/2020 |

(Continued)

OTHER PUBLICATIONS

Kamps et al, European Polymer Journal, 135 (2020) 109901 (Year: 2020).*

(Continued)

*Primary Examiner* — Doris L Lee
(74) *Attorney, Agent, or Firm* — Osha Bergman Watanabe & Burton LLP

(57) ABSTRACT

Described is a transparent polymer-based composite and a method for preparing a transparent polymer-based composite. The transparent polymer-based composite includes an activated polycarbonate and one or more nanoparticles grafted to the activated polycarbonate. The activated carbonate is formed via a transcarbonation reaction of a mixture of a carbonic acid species having terminal ester groups and a bisphenol-A with sodium hydroxide and ortho-dichlorobenzene. The transparent polymer-based composite may be used to replace the glass front-sheet of solar panels for photovoltaic applications.

13 Claims, 4 Drawing Sheets

(56)          References Cited

U.S. PATENT DOCUMENTS

| | | | | |
|---|---|---|---|---|
| 2004/0063867 A1* | 4/2004 | Cruz | ..................... | C08L 27/06 |
| | | | | 525/418 |
| 2010/0280176 A1* | 11/2010 | Biswas | ................. | B82Y 30/00 |
| | | | | 524/730 |
| 2011/0034585 A1* | 2/2011 | Christmann | .......... | B82Y 30/00 |
| | | | | 977/773 |
| 2022/0145073 A1* | 5/2022 | Seidel | .................... | C08L 33/12 |

FOREIGN PATENT DOCUMENTS

| | | |
|---|---|---|
| EP | 1363962 B1 | 7/2006 |
| JP | S61162009 A | 7/1986 |
| KR | 20050019744 A | 3/2005 |

OTHER PUBLICATIONS

Kamps et al, Polym. Chem. 2016, 7, 5294 (Year: 2016).*

Chen, Peng, et al., "Increased Flow Property of Polycarbonate by Adding Hollow Glass Beads", Polymer Engineering and Science, Society of Plastics Engineers, 2005, pp. 1119-1131 (13 pages).

Destino, Joel F., et al., "3D Printed Optical Quality Silica and Silica-Titania Glasses from Sol-Gel Feedstocks", Advanced Materials Technologies, No. 1700323, 2018, pp. 1-10 (10 pages).

"Introduction to GSC", JACI Textbook: Learning from social practice cases that received the GSC Awards, Japan Association for Chemical Innovation, No. 5, Aug. 2016 (11 pages).

Kamps, J.H., et al., "Activated carbonates: enabling the synthesis of differentiated polycarbonate resins via melt transcarbonation", Polymer Chemistry, Royal Society of Chemistry, vol. 7, Issue 7, Sep. 2016, pp. 5294-5303 (10 pages).

Luyt, A.S., et al., "Polycarbonate reinforced with silica nanoparticles", Polymer Bulletin, Springer, vol. 66, 2011, pp. 991-1004 (14 pages).

Müller, M., "Mechanical properties of resin reinforced with glass beads", Agronomy Research, vol. 15, Issue S1, 2017, pp. 1107-1118 (12 pages).

Nishimoto, M., et al., "Miscibility of polycarbonate with methyl methacrylate-based copolymers", Polymer, Butterworth-Heinemann Ltd., vol. 32, No. 7, 1991, pp. 1274-1283 (10 pages).

Wildner, Wolfgang and Dietmar Drummer, "Light scattering of glass-particle filled matrices with similar refractive index", Journal of Composite Materials, Sage, vol. 52, No. 30, 2018, pp. 4231-4246 (16 pages).

International Search Report issued in International Application No. PCT/US2023/035617 dated Jan. 24, 2024 (4 pages).

Written Opinion issued in International Application No. PCT/US2023/035617 dated Jan. 24, 2024 (6 pages).

* cited by examiner

~~~CH₂ ... PMMA

104

Activated PC

+

Activated PC-g-PMMA Graft Copolymer

PROCESS FOR MAKING TRANSPARENT POLYMER-BASED MATERIALS FOR SOLAR PANELS

BACKGROUND

Capturing solar energy through photovoltaic panels, in order to produce electricity, is considered one of the most promising applications in the renewable energy sector. Due to its fast growth perspectives and sustainability benefits, the photovoltaic market has attracted increasing attention in the last decade, involving important investments and R&D programs around the world. The current market is dominated by rigid, crystalline silicon-based photovoltaic (PV) systems that are typically composed of a rigid aluminum frame and a glass front sheet. The substitution of the glass used as front sheets in rigid PV solar panels with highly transparent polymer-based materials and composites, such as polycarbonate, would significantly increase the use and market share of hydrocarbon-based polymeric materials.

Compared to inorganic glass, polycarbonate offers a number of advantages, including a much lighter weight material and higher impact resistance. However, polycarbonate has several limitations that prevent it from being widely used in such applications, specifically its modest scratch resistance. Another challenge is that the industrial production of transparent polycarbonate is performed using high-cost and high residence-time melt transcarbonation processes at elevated temperatures, which may result in side reactions and cost increases. Another synthetic method is interfacial phosgenation which is very hazardous due to the use of toxic reagents, such as $COCl_2$. Interfacial phosgenation also generates large amounts of wastewater produced from washing away the impurities of the film.

Numerous studies have reported the benefit of incorporating reinforcements into organic matrices with the most common reinforcements encountered in the literature being silica nanoparticles. For a given volume fraction, the incorporation of such reinforcements has shown an improvement in the scratch resistance of polycarbonate compared to that of virgin polymer. The second advantage of using nanoparticles is that improvements are generally observed with incorporation of low amounts of nanoparticles, which may offset the higher cost. The dispersion of nanoparticles into polycarbonate is a very critical parameter affecting the final behavior of the polymer. For instance, dispersion is dependent on a variety of factors, including the shape, size, and interactions of the nanoparticles with the polycarbonate matrix.

Despite the progress made in recent years, the use of nanoparticles to improve the scratch resistance of polycarbonate still remains complicated. The chemical modification of the surface of nanoparticles may enhance their chemical compatibility with polycarbonate to a certain extent; however, the nanoparticles still need to be strongly bonded with the polymers to produce a durable organic matrix.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a transparent polymer-based composite comprising an activated polycarbonate and nanoparticles grafted to the activated polycarbonate.

In another aspect, embodiments disclosed herein relate to transparent polymer-based composite synthesized by an activated polycarbonate formed via a transcarbonation reaction of a mixture of a carbonic acid species having terminal ester groups and a bisphenol-A with sodium hydroxide and ortho-dichlorobenzene and one or more nanoparticles grafted to the activated polycarbonate.

In another aspect, embodiments disclosed herein relate to grafting a poly(methyl methacrylate) (PMMA) to the activated polycarbonate via one or more ester bonds, forming an active polycarbonate-poly(methyl methacrylate) copolymer.

In another aspect, embodiments disclosed herein relate to inorganic filler grafted to the activated polycarbonate via one or more urethane bonds.

In another aspect, embodiments disclosed herein relate to a method of preparing a transparent polymer-based composite. The method includes preparing an activated polycarbonate and grafting nanoparticles to the activated polycarbonate.

Other aspects and advantages of the claimed subject matter will be apparent from the following description and the appended claims.

BRIEF DESCRIPTION OF DRAWINGS

FIG. 1 illustrates a transcarbonation reaction to synthesize an activated polycarbonate according to embodiments of this disclosure.

FIG. 2 illustrates a reaction to form an activated PC-g-PMMA graft co-polymer according to embodiments of this disclosure.

FIG. 3 illustrates a reaction for grafting nanoparticles with activated polycarbonate according to embodiments of this disclosure.

DETAILED DESCRIPTION

Figure 4:
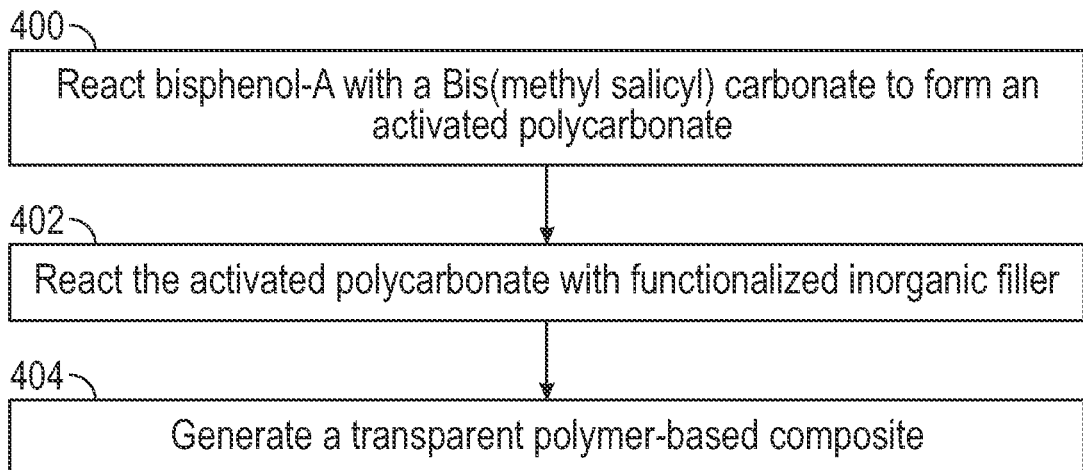
FIGS. 4 and 5 are schematic representations of methods for preparing transparent polymer-based materials according to embodiments of this disclosure.

In the following detailed description of embodiment of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of the present disclosure are directed to a process for preparing transparent polycarbonate films using activated polycarbonate. The transparent polycarbonate films may be used to offset glass in renewable, industrial, and automotive applications. Compared to inorganic glass, polycarbonate offers a number of advantages, such as lighter weight and higher impact resistance. However, polycarbonate also has limitations that prevent it from being widely used in such applications, such as its modest scratch resistance. Another challenge is using high-cost and high residence-time melt transcarbonation processes at elevated temperatures, which may result in cost increases.

Numerous studies have reported the benefit of incorporating reinforcements into organic matrices, and the most common reinforcements encountered in the literature are silica nanoparticles. However, the dispersion of nanoparticles into polycarbonate is a very critical parameter affecting the final behavior of the polymer. The chemical modification of the surface of nanoparticles may be a solution to enhance their chemical compatibility with polycarbonate; however, the nanoparticles still need to be strongly bonded with the polymers to produce a durable organic matrix.

In one or more embodiments, a polycarbonate with functionalized nanoparticles that are chemically anchored through chemical bindings may be produced. The introduction of reactive functional groups on the nanoparticle surfaces endow them with reactive properties to be part in chemical reactions and anchor them to the polymer matrix and, consequently, ensure their uniform dispersion in a polymeric matrix.

A polycarbonate is a thermoplastic polymer containing carbonate groups in its chemical structure. Products made from polycarbonate often contain the precursor monomer bisphenol A, or BPA. Typically, two production methods have been shown to produce high-quality polycarbonate resins. The first method is a two-phase interfacial process, and the second is a melt transcarbonation process. The transcarbonation process does not require a solvent, but long residence times at elevated temperatures can cause problems in the resulting product. To reduce the required reaction temperature and time, an activated carbonate species having an electron-withdrawing functionality substituted on the phenolic leaving group may be utilized. The introduction of a known electron-withdrawing group on the ortho- or para-position leads to an activated carbonate.

Figure 1:
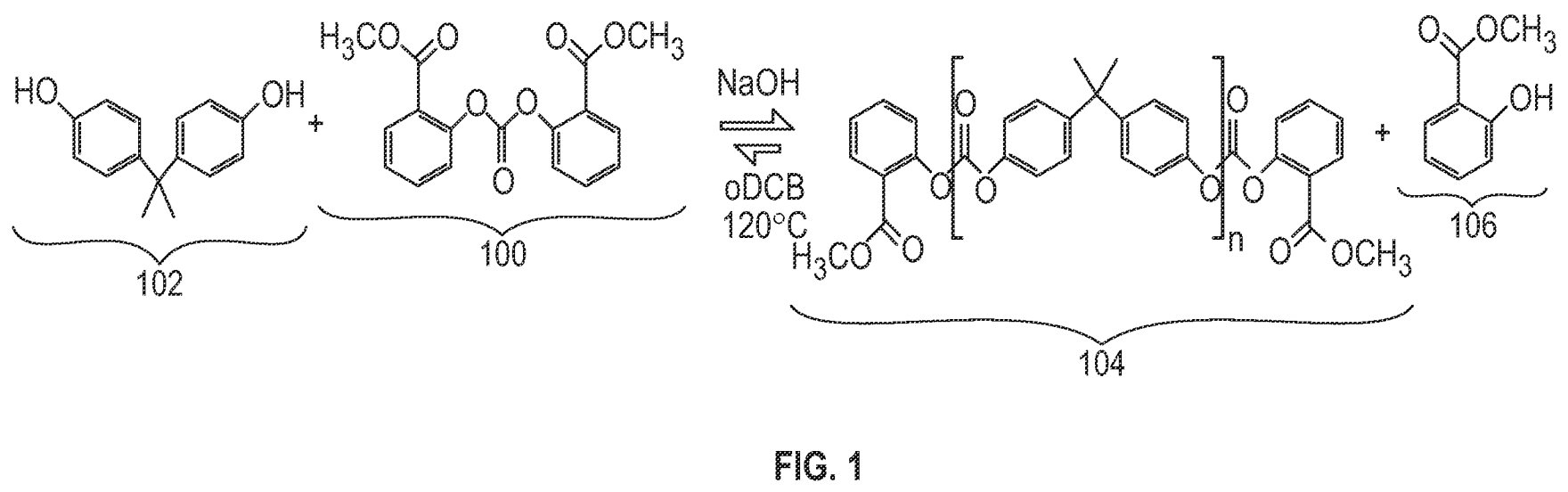

FIG. 1 is a schematic representation of synthesis of an activated polycarbonate through a transcarbonation reaction. The activated polycarbonate may be formed from a reaction of a carbonic acid species (100) having terminal ester groups and a BPA (102) (or other bisphenol species) mixed with sodium hydroxide (NaOH) and ortho-dichlorobenzene (oDCB). In one or more embodiments, the mixture includes bis(methyl salicyl) carbonate in an amount ranging from 1 gram to 5 grams, such as 2.5 grams to 3.5 grams, BPA in an amount ranging from 0.5 grams to 4 grams, such as 1.5 grams to 2.5 grams, NaOH in an amount ranging from 0.1 milligrams to 3 milligrams, such as 0.5 milligrams to 1.5 milligrams, and oDCB in an amount ranging from 10 milliliters to 50 milliliters, such as 20 milliliters to 30 milliliters. The mixture may be heated to between temperature 60° C. and 160° C., such as 120° C. in a melt transcarbonation process. Following transcarbonation, a bisphenol-A-polycarbonate may be synthesized. Methyl 2-hydroxybenzoate (106) may be a by-product of the reaction. Activated carbonate species, such as an activated polycarbonate, have an electron-withdrawing functionality substituted on the phenolic leaving group.

Figure 2:
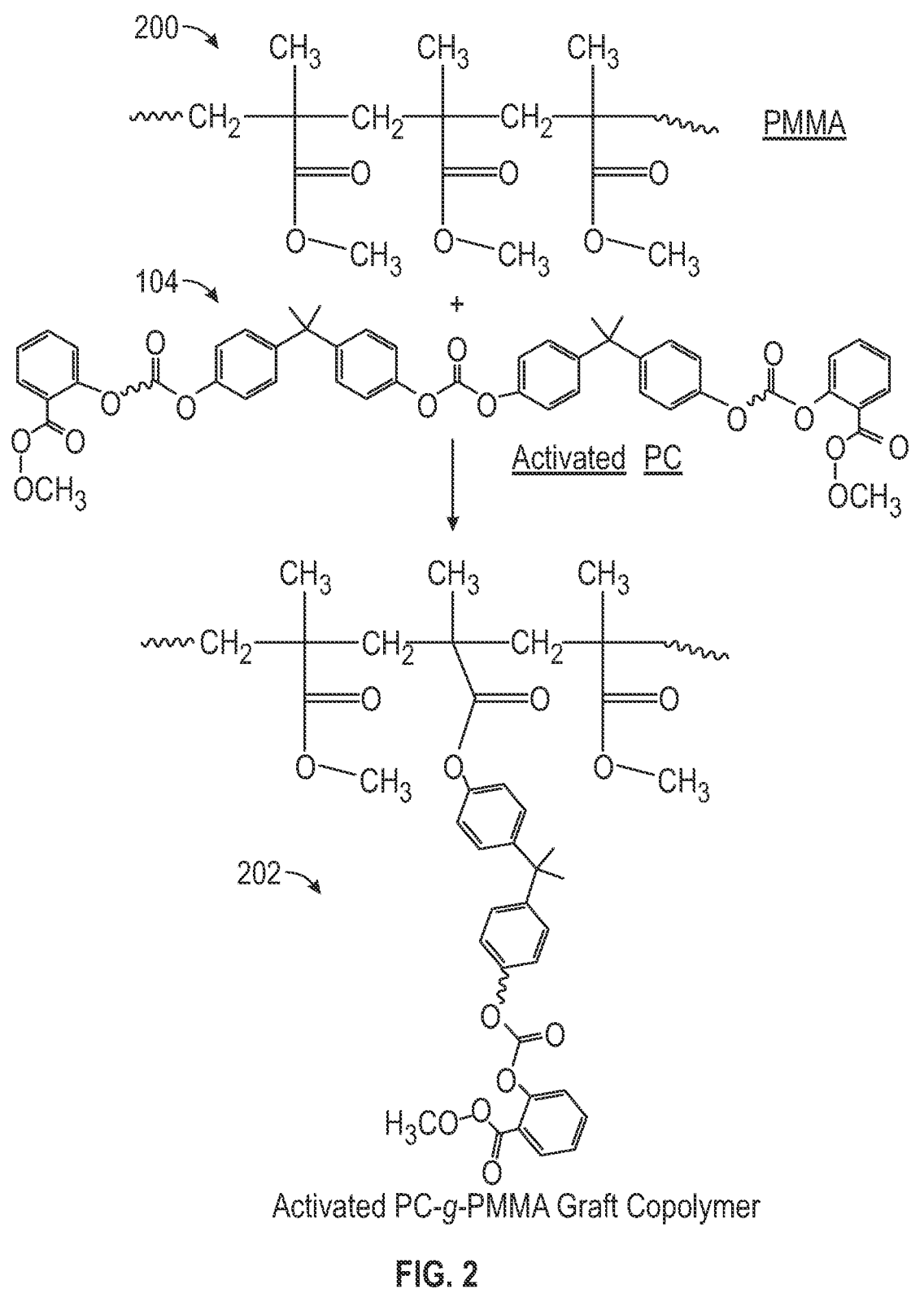

FIG. 2 is a schematic representation of a reaction for preparing a transparent composite according to embodiments of the present disclosure. Specifically, FIG. 2 illustrates graft copolymer formation between an activated polycarbonate and poly(methyl methacrylate) (PMMA). The reaction depicted may occur in the presence of organometallic catalyst, tin(II) 2-ethylhexanoate. The PMMA (200) reacts with the activated polycarbonate (104) to form an active polycarbonate-poly(methyl methacrylate) copolymer (202) via ester bonds. The PMMA (200) may be a homopolymer or copolymer. The PMMA (200) polymer or copolymer may have a weight average molecular weight of at least 3,000 grams per mole. In some embodiments, the PMMA (200) polymer or copolymer may have a weight average molecular weight of at least 15,000 grams per mole, 100,000 grams per mole, 120,000 grams per mole, 150,000 grams per mole, 200,000 grams per mole, 215,000 grams per mole, or 250,000 grams per mole. The PMMA (200) polymer or copolymer may have a weight average molecular weight of up to 330,000 grams per mole, in some embodiments, up to 350,000 grams per mole, and in some embodiments, up to 400,000 grams per mole. It should generally be understood that the PMMA (200) polymer or copolymer is a linear polymer or copolymer.

In one or more embodiments, the PMMA (200) polymer may be a copolymer that includes comonomers. In one or more embodiments the comonomer may include acrylates, such as n-butyl-acrylate, ethyl acrylate, 2-ethylhexyl acrylate; methacrylates, such as ethyl methacrylate, butyl methacrylate; acrylic acids and methacrylic acids, and their salts; fluorinated acrylics; styrene, acrylamide; acrylonitrile; and combinations thereof.

Figure 3:
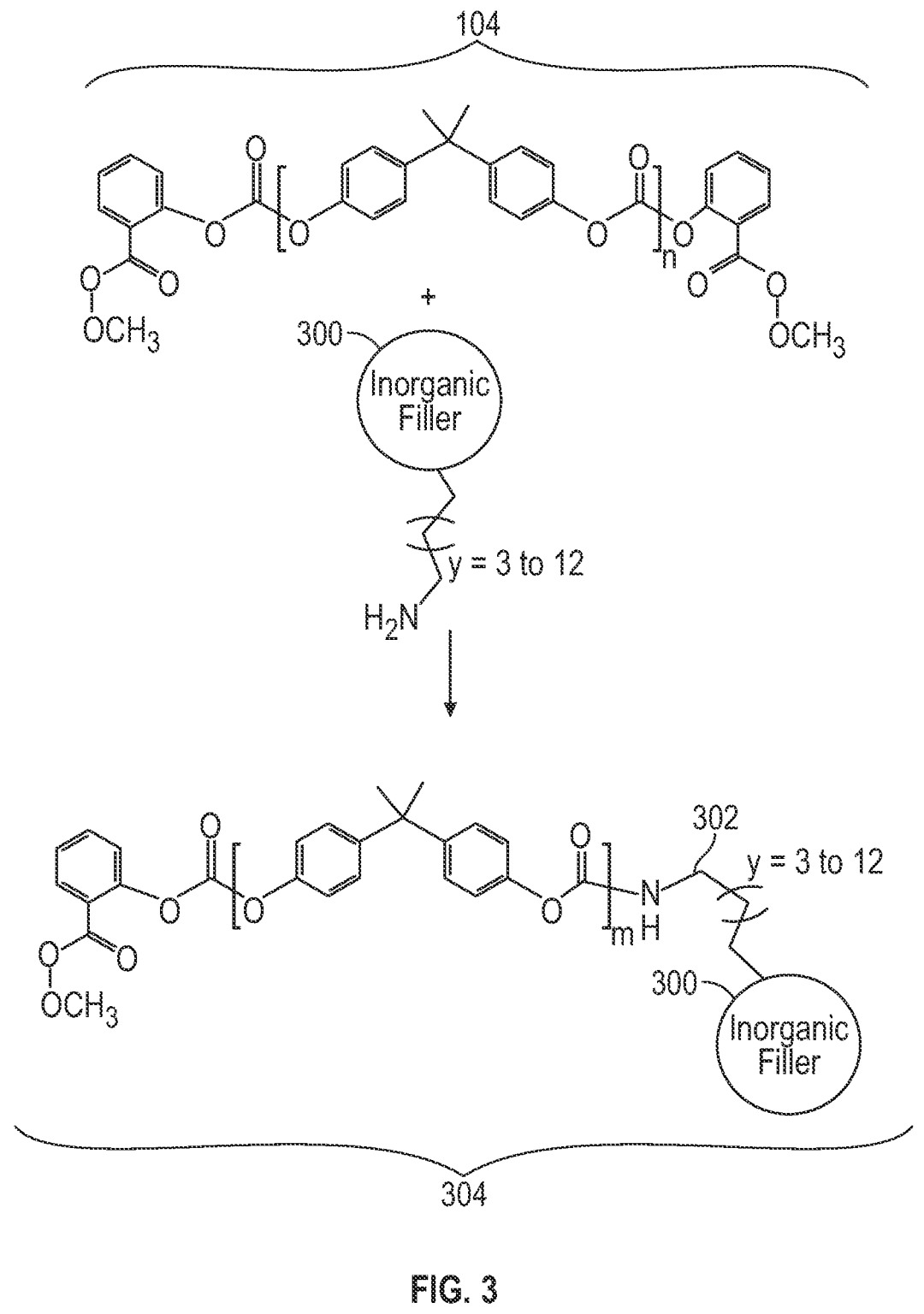

FIG. 3 is a schematic representation of another reaction for preparing a transparent composite according to embodiments of the present disclosure. Specifically, FIG. 3 illustrates grafting of fillers (300) (or functionalized nanoparticles) in the activated polycarbonate (104) via urethane bonds (302) to enhance the properties of the resulting modified polycarbonate (304), where Y denotes the number of repeated methylene groups (CH 2). Non-limiting examples of fillers include silica, zinc oxide, titanium oxide, and zirconium oxide, or combinations thereof, with sizes ranging from 50 nanometers (nm) to 500 nm. In one or more embodiments, an inorganic filler (300) functionalized with amine-terminated silanes reacts with the carbonate groups of the activated polycarbonate (104) to produce the modified polycarbonate (304).

In one or more embodiments, the filler is comprised of nanoparticles. In some embodiments, the nanoparticles are dendritic fibrous nanoparticles (DFNs). In one or more embodiments, the DFNs may be dendritic fibrous silica nanoparticles. The nanoparticles may be prepared by hydrothermal, hydrothermal microwave assisted techniques, or any other technique known to one skilled in the art. In one or more embodiments, the nanoparticles may be modified via surface functionalization. In one or more embodiments, the nanoparticles may be chemically modified with a compound, such as amine-terminated silanes. The chemical modification of each nanoparticle enables it to attach with the activated polycarbonate (104). Introducing new functional groups on a nanoparticle surface endows the nanoparticle with reactive properties. Therefore, the nanoparticle may participate in chemical reactions and anchor onto the polymer matrix.

In some embodiments, the modification of polycarbonate reaction may be conducted in a three-necked flask equipped with a stirrer in the presence of isopropanol as a solvent at a temperature ranging between 25° C. and 70° C.

In some embodiments, the grafting of the activated polycarbonate may be prepared by mixing between 0.1 grams and 1 gram, such as 0.5 grams, of activated polycarbonate and between 0.01 grams and 0.1 grams, such as 0.05 grams, of functionalized silica in solution in ethanol in a three-necked flask equipped with a stirrer. Following mixing, the mixture may be heated between 80° C. and 120° C., such as 100° C., for approximately 48 hours. The resulting modified polymer-based composite (modified polycarbonate) may then be collected after solvent evaporation.

Processes of manufacturing nanocomposite compositions in accordance with the present disclosure may include various methods, such as solution casting, compounding/extrusion, blending, solvent casting, and other formulation techniques. Nanocomposite compositions in accordance with embodiments of the present disclosure will generally possess physical properties suitable for the intended use of the composition and the articles produced therefrom. One of ordinary skill in the art, with the benefit of this present disclosure, will appreciate that altering the relative amounts and identities of the components of a polymer composition will influence the resulting properties of the composition. The resulting nanocomposite composition may be produced in the form of a film or substrate depending upon its ultimate use or application. The nanocomposite compositions may be prepared in any known process for film and substrate formulation, such as in-situ polymerization, solvent casting, blending, and compounding.

In one or more embodiments, a nanocomposite film may be prepared by solvent casting by dissolving the modified polycarbonate formed as described above in chloroform at 20% (w/w) followed by slow evaporation.

In some embodiments, the nanocomposite can be formed into a film using conventional filmmaking techniques, such as melt compounding and extrusion of the nanocomposite composition. In one or more embodiments, films of the nanocomposite compositions may be prepared using continuous or discontinuous extrusion. In some embodiments, raw materials can be added to an extruder, simultaneously or sequentially, into the main or secondary feeders in the form of powder, granules, flakes, or dispersion in liquids as solutions, emulsions, and suspensions of one or more components to produce the extruded films.

In some embodiments, the nanoparticles (e.g., silica particles) may be modified with a 3-aminopropyltriethoxysilane prior to reaction with the activated polycarbonate to furnish the silica with a reactive site for further polymer attachment. The silica particles may then be dried for approximately one hour at 100° C. and immediately moved into a round-bottom flask. A solution of about 10% to 20% by volume by volume (v/v %) of 3-aminopropyltriethoxysilane in toluene may be prepared and added to the flask. The resulting mixture may be refluxed for approximately one day, and the suspension may then be cooled. Solid product may be isolated from the solution by repeated centrifugation using polar and non-polar solvents. The modified silica powder may be ground to a fine powder. The modified silica can then be reacted with activated polycarbonate (104).

Figure 5:
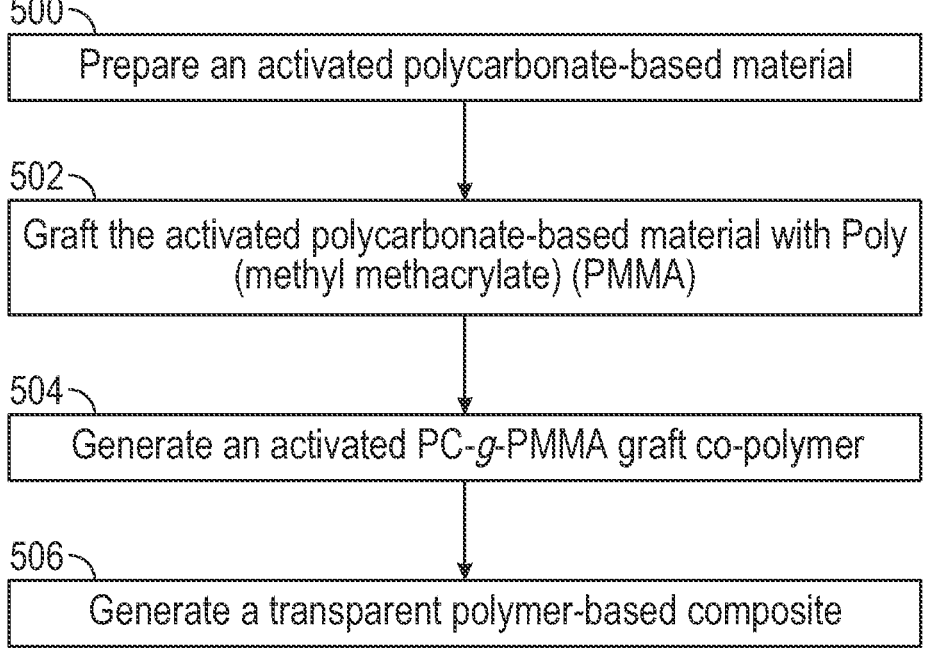

FIGS. 4 and 5 are flow diagrams illustrating methods for preparing a transparent polymer-based material according to embodiments of this disclosure. Referring to FIG. 4, in a first step (400) a bisphenol-A is reacted with a bis(methyl salicyl) carbonate to form an activated polycarbonate. In a next step (402), the activated polycarbonate is reacted with a functionalized inorganic filler. In a final step (404), a transparent polymer-based composite is generated.

Referring to FIG. 5, in a first step (500) an activated polycarbonate-based material is prepared. In a next step (502), the activated polycarbonate-based material is reacted with a PMMA via a grafting process. In a next step (504), an active PC-g-PMMA copolymer is generated. In a final step (506), a transparent polymer-based composite is generated.

Embodiments disclosed herein describe a new, cost-effective, and ecofriendly process to the synthesis of transparent polymer-based composites for the replacement of the glass front-sheet of solar panels for photovoltaic applications. Specifically, the method according to embodiments of this disclosure may be utilized to generate cost-effective and energy-efficient solar panels by employing activated transcarbonation and optimizing the average molecular weight of the film. The front sheet of typical photovoltaic panels is made from the glass. The use of polycarbonate as an alternative is an attractive solution due to its low density and high impact resistance. Additional applications include, but are not limited to, the manufacturing of materials useful in construction, automotive, and aviation industries.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

The singular forms "a," "an," and "the" include plural referents, unless the context clearly dictates otherwise.

As used here and in the appended claims, the words "comprise," "has," and "include" and all grammatical variations thereof are each intended to have an open, nonlimiting meaning that does not exclude additional elements or steps.

"Optionally" means that the subsequently described event or circumstances may or may not occur. The description includes instances where the event or circumstance occurs and instances where it does not occur.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A transparent polymer-based composite, comprising:
an activated polycarbonate formed via a transcarbonation reaction of a mixture of a carbonic acid species having terminal ester groups and a bisphenol-A with sodium hydroxide and ortho-dichlorobenzene; and
one or more dendritic fibrous nanoparticles grafted to the activated polycarbonate,
wherein the one or more dendritic fibrous nanoparticles is an inorganic filler grafted to the activated polycarbonate via one or more urethane bonds.

2. The transparent polymer-based composite of claim 1, wherein the carbonic acid species is bis(methyl salicyl) carbonate.

3. The transparent polymer-based composite of claim 1, wherein each nanoparticle is modified with a 3-aminopropyltriethoxysilane.

4. The transparent polymer-based composite of claim 1, wherein the mixture comprises from 1 gram to 5 grams of bis(methyl salicyl) carbonate as the carbonic acid species, from 0.5 grams to 4 grams of the bisphenol-A, from 0.1 milligrams to 3 milligrams of the sodium hydroxide, and 10 milliliters to 50 milliliters of the ortho-dichlorobenzene.

5. The transparent polymer-based composite of claim 1, wherein the one or more dendritic fibrous nanoparticles are dendritic fibrous silica nanoparticles, and wherein from 0.01 grams to 0.1 grams of the dendritic fibrous silica nanoparticles are grafted to from 0.1 grams to 1 gram of the activated polycarbonate.

6. The transparent polymer-based composite of claim 1, wherein the one or more dendritic fibrous nanoparticles is selected from the group consisting of silica, titanium oxide, zinc oxide, and zirconium oxide.

7. The transparent polymer-based composite of claim 6, wherein each nanoparticle is modified with a reactive functional group.

8. The transparent polymer-based composite of claim 7, wherein the reactive functional group is an amine-terminated silane.

9. A method of preparing the transparent polymer-based composite of claim 1, comprising:

forming the activated polycarbonate via the transcarbonation reaction of the mixture of the carbonic acid species having terminal ester groups and the bisphenol-A with sodium hydroxide and ortho-dichlorobenzene; and grafting the one or more dendritic fibrous nanoparticles to the activated polycarbonate.

10. The method of claim 9, wherein forming the activated polycarbonate comprises:

mixing bis(methyl salicyl) carbonate as the carbonic acid species in an amount ranging from 1 gram to 5 grams, the bisphenol-A in an amount ranging from 0.5 grams to 4 grams, the sodium hydroxide in an amount ranging from 0.1 milligrams to 3 milligrams, and the ortho-dichlorobenzene in an amount ranging from 10 milliliters to 50 milliliters; and heating the mixture to a temperature between 60° C. and 160° C.

11. The method of claim 9, wherein grafting the one or more dendritic fibrous nanoparticles to the activated polycarbonate comprises reacting at least one poly(methyl methacrylate) (PMMA) with the activated polycarbonate in presence of a tin (II) 2-ethylhexanoate, thereby forming an active polycarbonate-poly(methyl methacrylate) copolymer.

12. The method of claim 9, wherein grafting the one or more dendritic fibrous nanoparticles to the activated polycarbonate comprises:

mixing the activated polycarbonate with functionalized silica in ethanol, wherein the activated polycarbonate is contained in an amount ranging from 0.1 grams to 1 gram, and the functionalized silica is contained in an amount ranging from 0.01 grams to 0.1 grams;

heating the mixture to a temperature between 80° C. and 120° C. for approximately 48 hours, thereby producing a modified polycarbonate; and dissolving the modified polycarbonate in chloroform at 20% (w/w) followed by evaporation.

13. The method of claim 9, further comprising modifying the one or more dendritic fibrous nanoparticles with a 3-aminopropyltriethoxysilane prior to reacting with the activated polycarbonate.

* * * * *